US011563805B2

(12) United States Patent
Yang

(10) Patent No.: US 11,563,805 B2
(45) Date of Patent: Jan. 24, 2023

(54) METHOD, APPARATUS, CLIENT TERMINAL, AND SERVER FOR DATA PROCESSING

(71) Applicant: Advanced New Technologies Co., Ltd., Grand Cayman (KY)

(72) Inventor: Xinying Yang, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/083,884

(22) Filed: Oct. 29, 2020

(65) Prior Publication Data
US 2021/0044653 A1   Feb. 11, 2021

Related U.S. Application Data

(63) Continuation of application No. PCT/CN2019/086790, filed on May 14, 2019.

(30) Foreign Application Priority Data

Aug. 1, 2018  (CN) .......................... 201810860851.1

(51) Int. Cl.
*H04L 67/1074* (2022.01)
*G06F 9/50* (2006.01)
(Continued)

(52) U.S. Cl.
CPC .......... *H04L 67/108* (2013.01); *G06F 9/5027* (2013.01); *G06Q 20/0658* (2013.01);
(Continued)

(58) Field of Classification Search
CPC ... G06F 9/5027; G06F 9/5033; H04L 9/0637; H04L 67/42; H04L 2209/38; H04L 67/108
See application file for complete search history.

(56) References Cited

U.S. PATENT DOCUMENTS 9,020,893 B2 * 4/2015 Zalpuri ................. G06F 16/273
707/636
9,201,751 B1 * 12/2015 Muthirisavenugopal ....................
G06F 16/185
(Continued)

FOREIGN PATENT DOCUMENTS

CN       101739292 A     6/2010
CN       102694860 A     9/2012
(Continued)

OTHER PUBLICATIONS

International Search Report in International Application No. PCT/CN2019/086790, dated Jul. 30, 2019.
(Continued)

*Primary Examiner* — Michael W Chao
(74) *Attorney, Agent, or Firm* — Finnegan, Henderson, Farabow, Garrett & Dunner, LLP

(57) ABSTRACT

Embodiments of the present specification provide a method, an apparatus, a client terminal, and a server for data processing. The method includes: selecting, based on a data attribute of to-be-processed data, a target coordinating server from a plurality of coordinating servers, the plurality of coordinating servers belonging to a plurality of server clusters respectively; and sending a data processing request to the target coordinating server, such that a server cluster to which the target coordinating server belongs processes the data processing request preferentially, the data processing request directing to the to-be-processed data.

14 Claims, 12 Drawing Sheets

(51) Int. Cl.
  *G06Q 20/06* (2012.01)
  *H04L 9/06* (2006.01)
  *H04L 67/01* (2022.01)
  *H04L 9/00* (2022.01)

(52) U.S. Cl.
  CPC ............ *H04L 9/0637* (2013.01); *H04L 67/01* (2022.05); *H04L 9/50* (2022.05); *H04L 2209/56* (2013.01)

(56) References Cited

U.S. PATENT DOCUMENTS

| | | | |
|---|---|---|---|
| 9,223,654 B2* | 12/2015 | Molaro | G06F 11/1096 |
| 9,330,107 B1* | 5/2016 | Kesselman | G06F 16/182 |
| 9,785,369 B1* | 10/2017 | Ateniese | H04L 9/0841 |
| 9,805,108 B2* | 10/2017 | Merriman | G06F 16/278 |
| 10,015,106 B1* | 7/2018 | Florissi | G06N 5/04 |
| 10,019,447 B1* | 7/2018 | O'Connell | G06F 16/10 |
| 10,203,897 B1* | 2/2019 | Cheah | G06F 13/20 |
| 10,270,707 B1* | 4/2019 | Florissi | G16B 30/00 |
| 10,359,968 B1* | 7/2019 | Chen | G06F 3/0665 |
| 10,366,111 B1* | 7/2019 | Florissi | G06F 16/27 |
| 10,896,057 B2* | 1/2021 | Miwa | G06F 9/5027 |
| 10,922,133 B2* | 2/2021 | He | G06F 9/50 |
| 10,922,143 B2* | 2/2021 | Therien | G06F 1/3296 |
| 10,938,567 B2* | 3/2021 | Martino | H04L 9/0894 |
| 10,963,285 B2* | 3/2021 | Bianchini | G06F 9/4881 |
| 10,965,566 B2* | 3/2021 | Nayak | H04L 41/0668 |
| 10,977,092 B2* | 4/2021 | Raman | G06F 9/524 |
| 10,977,260 B2* | 4/2021 | Pal | H04L 67/22 |
| 11,409,577 B2* | 8/2022 | Therien | G06F 9/3009 |
| 2005/0108717 A1* | 5/2005 | Hong | G06F 9/5033 718/102 |
| 2014/0052750 A1 | 2/2014 | Ciabrini et al. | |
| 2015/0319242 A1* | 11/2015 | Olster | G06F 11/2094 707/634 |
| 2016/0085645 A1* | 3/2016 | Buzzard | G06F 11/2092 714/6.21 |
| 2017/0074962 A1* | 3/2017 | Badawy | G01S 3/065 |
| 2017/0149883 A1* | 5/2017 | Joshi | H04L 67/16 |
| 2017/0180469 A1 | 6/2017 | Ford et al. | |
| 2017/0364450 A1* | 12/2017 | Struttmann | G06F 12/1408 |
| 2018/0006831 A1* | 1/2018 | Toll | G06Q 40/04 |
| 2018/0018723 A1* | 1/2018 | Nagla | H04L 9/3236 |
| 2018/0248880 A1* | 8/2018 | Sardesai | H04L 63/101 |
| 2019/0050855 A1* | 2/2019 | Martino | H04L 9/0643 |
| 2019/0173666 A1* | 6/2019 | Ardashev | H04L 9/3239 |
| 2019/0188043 A1* | 6/2019 | Jalai | H04W 72/04 |
| 2019/0238316 A1* | 8/2019 | Padmanabhan | H04L 9/3297 |
| 2019/0279750 A1* | 9/2019 | Wang | H04L 63/123 |
| 2019/0317788 A1* | 10/2019 | Lang | G06F 9/5061 |
| 2019/0325038 A1* | 10/2019 | Finlow-Bates | G06F 16/27 |
| 2019/0354944 A1* | 11/2019 | Russinovich | G06Q 20/065 |
| 2019/0361988 A1* | 11/2019 | Petters | G06F 16/182 |
| 2019/0379754 A1* | 12/2019 | Krishnaswamy | H04L 67/289 |
| 2020/0004861 A1* | 1/2020 | Bastawala | H04L 67/141 |
| 2020/0142634 A1* | 5/2020 | Surcouf | G06F 3/061 |
| 2020/0250132 A1* | 8/2020 | Ramsden | G06F 16/13 |
| 2020/0380475 A1* | 12/2020 | Krueger | H04L 9/3247 |
| 2021/0004281 A1* | 1/2021 | Kuo | G06F 9/5027 |
| 2021/0055955 A1* | 2/2021 | Yankelevich | G06F 9/485 |
| 2021/0081248 A1* | 3/2021 | berg | G06F 9/4843 |
| 2021/0234702 A1* | 7/2021 | Bekiyants | A43B 1/14 |
| 2022/0019367 A1* | 1/2022 | Freilich | G06F 3/0683 |
| 2022/0027064 A1* | 1/2022 | Botes | G06F 3/065 |
| 2022/0159069 A1* | 5/2022 | Shirley | H04L 67/568 713/157 |

FOREIGN PATENT DOCUMENTS

| | | |
|---|---|---|
| CN | 102750238 A | 10/2012 |
| CN | 102761528 A | 10/2012 |
| CN | 103927231 A | 7/2014 |
| CN | 104869140 A | 8/2015 |
| CN | 105959395 A | 9/2016 |
| CN | 106716421 A | 5/2017 |
| CN | 107079059 A | 8/2017 |
| CN | 107220310 A | 9/2017 |
| CN | 107453896 A | 12/2017 |
| CN | 107621973 A | 1/2018 |
| CN | 108345643 A | 7/2018 |
| CN | 108345685 A | 7/2018 |
| WO | WO 2018/120129 A1 | 7/2018 |

OTHER PUBLICATIONS

Written Opinion of the International Search Authority in the International Application No. PCT/CN2019/086790, dated Jul. 30, 2019.

* cited by examiner

METHOD, APPARATUS, CLIENT TERMINAL, AND SERVER FOR DATA PROCESSING

CROSS-REFERENCE TO RELATED APPLICATIONS

This application is a continuation application of International Application No. PCT/CN2019/086790, filed on May 14, 2019, which is based upon and claims priority to Chinese Patent Application No. 201810860851.1, filed on Aug. 1, 2018, the entire content of all of which is incorporated herein by reference.

TECHNICAL FIELD

Embodiments of the present specification relate to the field of computer technologies, and in particular to a method, an apparatus, a client terminal, and a server for data processing.

BACKGROUND

With the rapid development of the Internet, various types of data have emerged and grown explosively. At present, blockchain technologies have become the directions of main attention and research in many technical fields due to their own characteristics of decentralization, untamperability, distribution, and the like.

In related technologies, a system for data processing may include a client terminal and a blockchain server. The blockchain server can join a blockchain network as a blockchain node. In actual services, the client terminal needs to perform frequent read and write operations on the blockchain server, such as reading block data from the blockchain server; or writing status data into the blockchain server. The status data can be configured to indicate a status of a member in a blockchain, e.g., an asset balance of a member account. In the above related technologies, the read and write operations of the client terminal for the blockchain server are relatively frequent, which may result in a high access pressure to the blockchain server and reducing the data processing speed of the system for data processing.

SUMMARY

An embodiment of the present specification provides a method for data processing, including: selecting, based on a data attribute of to-be-processed data, a target coordinating server from a plurality of coordinating servers, the plurality of coordinating servers belonging to a plurality of server clusters respectively; and sending a data processing request to the target coordinating server, such that a server cluster to which the target coordinating server belongs processes the data processing request preferentially, the data processing request directing to the to-be-processed data.

An embodiment of the present specification provides a client terminal, including: a memory configured to store computer instructions; and a processor configured to execute the computer instructions to perform: selecting, based on a data attribute of to-be-processed data, a target coordinating server from a plurality of coordinating servers, the plurality of coordinating servers belonging to a plurality of server clusters respectively; and sending a data processing request to the target coordinating server, such that a server cluster to which the target coordinating server belongs processes the data processing request preferentially, the data processing request directing to the to-be-processed data.

An embodiment of the present specification provides a method for data processing and applied to a first coordinating server. The method includes: receiving a block data read request sent from a client terminal, the block data read request carrying a position value of block data to be read; sending the position value to a second coordinating server when the position value does not satisfy a position value determining condition; receiving the block data directed by the position value sent from the second coordinating server; and sending the block data to the client terminal.

An embodiment of the present specification provides a first coordinating server, including: a memory configured to store computer instructions; and a processor configured to execute the computer instructions to perform: receiving a block data read request sent from a client terminal; the block data read request carrying a position value of block data to be read; sending the position value to a second coordinating server when the position value does not satisfy a position value determining condition; receiving the block data directed by the position value sent from the second coordinating server; and sending the block data to the client terminal.

An embodiment of the present specification provides a method for data processing and applied to a first coordinating server. The method includes: receiving a block data read request sent from a client terminal, the block data read request carrying a position value of block data to be read; acquiring the block data directed by the position value when the position value satisfies a position value determining condition; and sending the block data to the client terminal.

An embodiment of the present specification provides a first coordinating server, including: a memory configured to store computer instructions; and a processor configured to execute the computer instructions to perform: receiving a block data read request sent from a client terminal, the block data read request carrying a position value of block data to be read; acquiring the block data directed by the position value when the position value satisfies a position value determining condition; and sending the block data to the client terminal.

The technical solutions provided in the above embodiments of the present specification have the following technical benefits: the client terminal can send data processing requests to different coordinating servers based on different data attributes of the to-be-processed data, and achieve load balancing of a plurality of server clusters, thereby accelerating the data processing.

BRIEF DESCRIPTION OF THE DRAWINGS

The accompanying drawings, which are incorporated in and constitute a part of the specification, illustrate embodiments consistent with the specification and, together with the description, serve to explain the principles of the specification.

DETAILED DESCRIPTION

Figure 1:
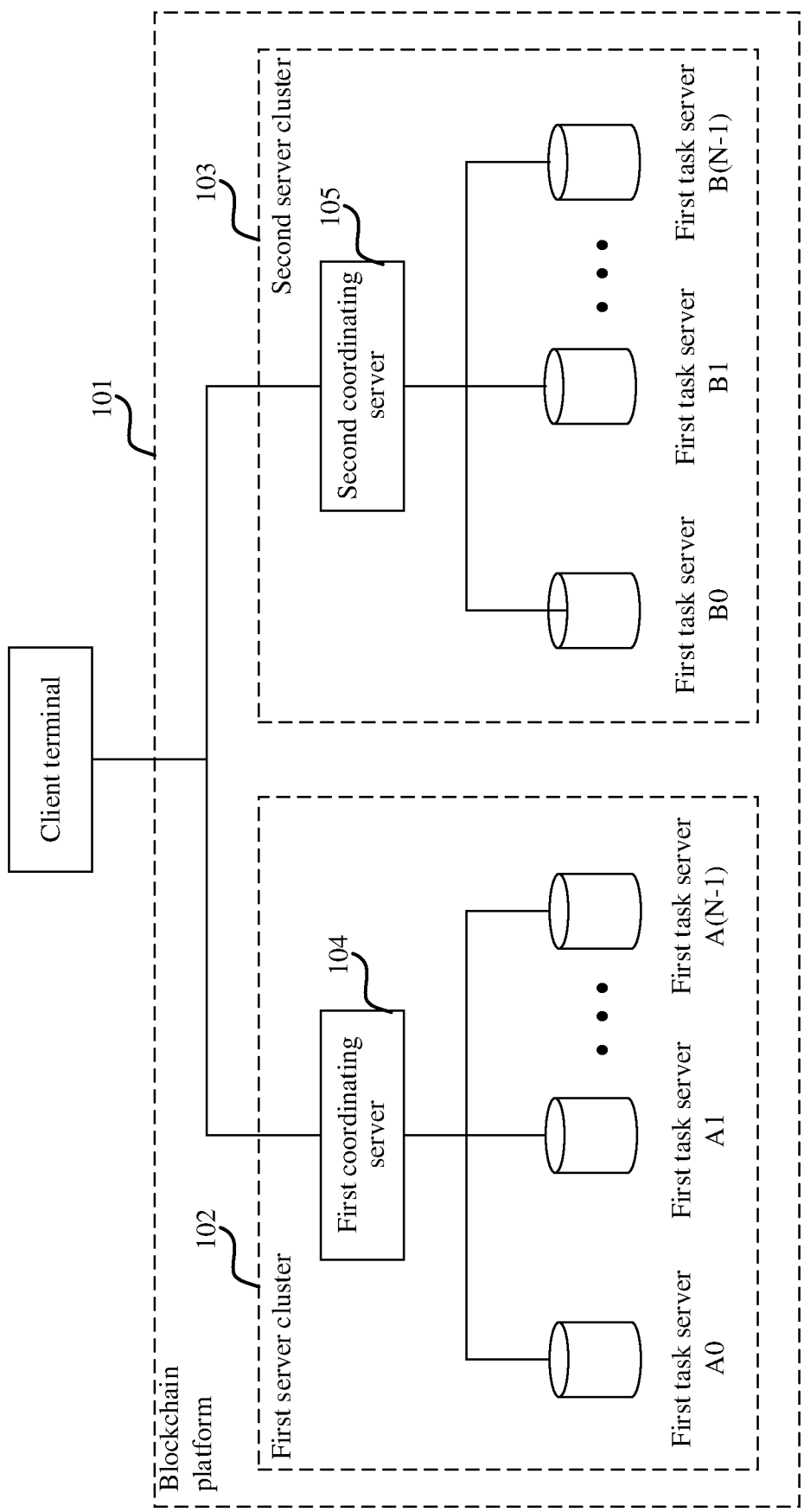
FIG. 1 is a schematic diagram of a system for data processing according to an embodiment.

Embodiments will be described in detail here, examples of which are shown in the drawings. When the following description refers to the accompanying drawings, unless otherwise indicated, the same numerals in different drawings represent the same or similar elements. The implementations described in the following example embodiments do not represent all implementations consistent with the specification. Rather, they are only examples of apparatuses and methods consistent with some aspects of the specification as recited in the appended claims.

In embodiments of the specification, a blockchain is a distributed ledger that organizes a plurality of pieces of block data in a chain structure in chronological order and uses a cryptographic algorithm to ensure security, traceability, and untamperability. The blockchain may include a public blockchain, a joint blockchain (also referred to as a consortium blockchain), a private blockchain, and the like.

A blockchain can be established between a plurality of individual users, groups, or organizations based on the blockchain technologies, who can then join in the blockchain and become members thereof. Transaction data between members can be stored in block data (Block) in the blockchain. Each piece of block data can record at least one piece of transaction data generated by a member in the blockchain within a specific temporal interval, and may include a block header, a block body, and the like.

The blockchain may correspond to a plurality of pieces of status data. Each piece of status data may correspond to a member identifier. The status data may be configured to describe a state of the member identifier. For example, the member identifier may include a member account, and the status data may include an asset balance of the member account. The member account and the asset balance are only examples, and the member identifier and the status data may also be other data.

The blockchain may include a plurality of pieces of block data. Each piece of block data in the blockchain may have a position value. Different pieces of block data have different position values. The position value may be configured to indicate a position of block data in the blockchain. The block data can be obtained from the blockchain based on the position value. In addition, the position value may also have an association relationship with a creation moment of the block data. For example, block data with an earlier creation moment has a smaller position value; and block data with a later creation moment has a larger position value. The position value may include a block height. The position value may also include any other data that can derive the position of the block data.

The blockchain may be implemented based on a blockchain network. The blockchain network may include a P2P network (peer-to-peer network) and the like. The blockchain network may include a plurality of blockchain nodes. Each blockchain node may store all or some of block data in the blockchain. Each blockchain node may be a server or a distributed server cluster that includes a plurality of servers.

A distributed server cluster may include a coordinating server and a plurality of task servers. The coordinating server may be responsible for task allocation and management. The task server may be responsible for task processing. The distributed server cluster can provide transaction services for the outside as a whole. The distributed server cluster may be implemented based on MPP (Massively Parallel Processing) architecture technologies. The distributed server cluster may also be implemented based on other architecture technologies, which is not limited in the embodiments of the specification.

FIG. 1 is a schematic diagram of a system for data processing according to an embodiment. For example, the system for data processing may include a blockchain platform 101. The blockchain platform 101 may serve as a blockchain node in a blockchain network. The blockchain platform 101 may include at least two server clusters. The at least two server clusters may include a first server cluster 102 and a second server cluster 103. The first server cluster 102 may include a first coordinating server 104 and a plurality of first task servers A0, A1, . . . , A(N−1). The second server cluster 103 may include a second coordinating server 105 and a plurality of second task servers B0, B1, . . . B(N−1). In some embodiments, compared with the first task servers, the second task servers may have a better hardware configuration and/or software configuration. Therefore, compared with the first server cluster 102, the second server cluster 103 may have a greater data processing capacity.

In an embodiment, the first server cluster 102 and the second server cluster 103 may store at least one piece of block data in the blockchain respectively. The block data in the first server cluster 102 and the second server cluster 103 may be considered as block data stored in the blockchain platform 101. In addition, as mentioned above, the blockchain platform 101 may serve as a blockchain node in the blockchain network. Thus, the block data in the first server cluster 102 and the second server cluster 103 may also be considered as block data stored at the blockchain node. Block data in the first server cluster 102 may be different from block data in the second server cluster 103. A total number of pieces of block data in the first server cluster 102 and the second server cluster 103 may be less than or equal to the number of pieces of block data in the blockchain.

A storage mode of block data in the first server cluster 102 is described below. For ease of description, a set of the block data in the first server cluster 102 may be referred to as a block data set. In the first server cluster 102, the block data in the block data set can be distributed and stored in the first task servers according to a first specific rule. The first specific rule may be flexibly set based on actual needs. For example, the first server cluster 102 may include N first task servers. Each first task server may have a first server identifier. The first server identifier may be configured to identify the first task server, e.g., may be an IP address, a MAC address, a number, or the like of the first task server. The first server identifiers of the N first task servers may be A0, A1, A2, . . . , A(N−1), respectively. Block data of which a position value has a remainder 0 when divided by N in the block data set may be stored in a first task server with a first server identifier A0; block data of which a position value has a remainder 1 when divided by N in the block data set may be stored in a first task server with a first server identifier A1; and similarly, block data of which a position value has a remainder N−1 when divided by N in the block data set may be stored in a first task server with a first server identifier A(N−1). In the first server cluster 102, the first coordinating server 104 may store position value configuration data. The position value configuration data may include at least one position value. Each position value in the position value configuration data may correspond to a first server identifier; and the block data directed by, also referred to as pointed by or corresponding to, the position value may be stored in the first task server identified by the first server identifier. A storage mode of block data in the second server cluster 103 may be similar to that of the block data in the first server cluster 102.

As noted above, the block data in the first server cluster 102 and the second server cluster 103 may be considered as the block data stored in the blockchain platform 101. In general, the block data, after generation, cannot be changed. Operations for the block data generally only include read operations (e.g., reading block data and reading transaction data of the block data). A read operation occupies fewer performance resources (e.g., CPU, internal storage, and external storage). In order to reserve more performance resources for the second server cluster 103 to process other types of data, a large number of pieces of block data with earlier creation time in the blockchain platform 101 may be stored in the first server cluster 102; and a small number of pieces of block data with later creation time in the blockchain platform 101 may be stored in the second server cluster 103. As noted above, compared with the first server cluster 102, the second server cluster 103 may have a greater data processing capacity. Thus, newly added block data of the blockchain platform 101 may be from the second server cluster 103, e.g., from the second coordinating server 105 and/or a second task server in the second server cluster 103. The newly added block data of the blockchain platform 101 may be first stored in the second server cluster 103, e.g., stored in a second task server in the second server cluster 103 according to the first specific rule. Thus, the second coordinating server 105 can migrate block data satisfying a position value determining condition in each second task server to the first server cluster 102 at a first preset time interval. For example, the second coordinating server 105 can acquire the block data satisfying the position value determining condition from each second task server; and can send the acquired block data to the first coordinating server 104. The first coordinating server 104 can receive the block data, and can store the received block data in the first task servers according to the first specific rule. A size of the first preset time interval may be flexibly set according to actual needs, e.g., may be 5 hours, 1 day, or 2 days. The position value determining condition may be flexibly set based on actual needs. For example, the position value determining condition may include: a difference between the position value and a maximum position value is greater than or equal to a first preset threshold. The maximum position value may be a position value of block data with the latest creation moment. The first preset threshold may be, e.g., 1000, 1052, or 1070. For another example, the position value determining condition may further include: the position value is less than or equal to a second preset threshold.

In an embodiment, the second server cluster 103 may also store status data of the blockchain. For example, the status data of the blockchain can change. Operations for the status data may include read operations and write operations. In order to accelerate processing for the status data, the status data of the blockchain may be stored in the second server cluster 103.

A storage mode of the status data in the second server cluster 103 is described below. For ease of description, a set of the status data in the blockchain may be referred to as a status data set. In the second server cluster 103, the status data in the status data set can be distributed and stored in the second task servers according to a second specific rule. The second specific rule may be flexibly set based on actual needs. For example, the second server cluster 103 may include N second task servers. Each second task server may have a second server identifier. The second server identifier may be configured to identify the second task server, e.g., may be an IP address, a MAC address, a number, or the like of the second task server. The second server identifiers of the N second task servers may be B0, B1, B2, . . . , B(N−1), respectively. Status data of which a position value has a remainder 0 when divided by N in the status data set may be stored in a second task server with a second server identifier B0; status data of which a position value has a remainder 1 when divided by N in the status data set may be stored in a second task server with a second server identifier B1; and similarly, status data of which a position value has a remainder N−1 when divided by N in the block data set may be stored in a second task server with a second server identifier B(N−1). In the second server cluster 103, the second coordinating server 105 may store member identifier configuration data. The member identifier configuration data may include at least one member identifier. Each member identifier in the member identifier configuration data may correspond to a second server identifier; and status data corresponding to the member identifier may be stored in the second task server identified by the second server identifier.

In an embodiment, the first coordinating server 104 in the first server cluster 102 may also store first code value configuration data. The second coordinating server 105 in the second server cluster 103 may also store second code value configuration data. The first code value configuration data and the second code value configuration data may both include at least one code value. Each code value in the first code value configuration data and the second code value configuration data may correspond to a position value. A total number of position values corresponding to code values in the first code value configuration data and the second code value configuration data may be less than or equal to the number of pieces of block data in the blockchain platform 101. The code value may be a code value of block data or a code value of transaction data. The code value of the block data may be configured to identify the block data, and may correspond to a position value of the block data. The code value of the transaction data may be configured to identify the transaction data, and may correspond to a position value of block data containing the transaction data. The code value may include a hash value. The hash value may be obtained from computation based on a hash algorithm. The hash algorithm may include SHA-1, SHA-224, SHA-256, SHA-512, and the like. In addition, when the code value in the first code value configuration data and the second code value configuration data is a code value of transaction data, each code value in the first code value configuration data and the second code value configuration data may also correspond to an offset. The offset can be configured to indicate an offset position of the transaction data corresponding to the code value in the block data, so as to facilitate quickly acquiring the transaction data from the block data.

As noted above, newly added block data of the blockchain platform 101 may be first stored in the second server cluster 103. Thus, a code value corresponding to the newly added block data in the blockchain platform 101 may be first added to the second code value configuration data. The code value corresponding to the newly added block data may be a code value of the block data or the code value of the transaction data of the block data. Thus, the second coordinating server 105 can migrate a code value satisfying a code value determining condition in the second code value configuration data to the first coordinating server 104 at a second preset time interval. For example, the second coordinating server 105 can acquire the code value satisfying the code value determining condition from the second code value configuration data; and can send the acquired code value to the first coordinating server 104. The first coordinating server 104 can receive the code value; and can add the received code value to the first code value configuration data. A size of the second preset time interval may be flexibly set according to actual needs, e.g., may be 10 hours, 5 days, or 10 days. The code value determining condition may be flexibly set based on actual needs. For example, the code value determining condition may include: the code value is less than or equal to a third preset threshold.

In an embodiment, the system for data processing may further include a client terminal. The client terminal may be a transaction server, a server cluster that includes a plurality of transaction servers, or the like. The client terminal can select, based on a data attribute of to-be-processed data, a target coordinating server from a plurality of coordinating servers; and can send a data processing request to the target coordinating server, such that a server cluster to which the target coordinating server belongs can process the data processing request preferentially.

Figure 2:
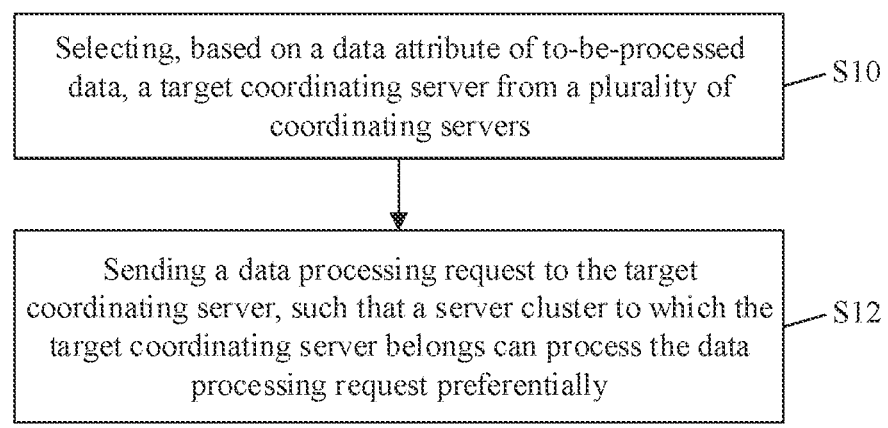
FIG. 2 is a flowchart of a method for data processing according to an embodiment.

FIG. 2 is a flowchart of a method for data processing according to an embodiment. For example, the method for data processing is performed by a client terminal, and may include the following steps.

Step S10: selecting, based on a data attribute of to-be-processed data, a target coordinating server from a plurality of coordinating servers.

In an embodiment, the data attribute may be configured to indicate whether the to-be-processed data can change. The to-be-processed data may include at least one of the following items: block data, status data, or transaction data. A data attribute of the block data is configured to indicate that the block data cannot change; a data attribute of the status data is configured to indicate that the status data can change; and a data attribute of the transaction data is configured to indicate that the transaction data cannot change.

In an embodiment, the plurality of coordinating servers may include a first coordinating server and a second coordinating server, such as the first coordinating server 104 and the second coordinating server 105 (FIG. 1). For example, the data attribute indicates that when the to-be-processed data cannot change, the client terminal can select the first coordinating server for use as the target coordinating server. When the data attribute indicates that the to-be-processed data can change, the client terminal can select the second coordinating server for use as the target coordinating server.

Step S12: sending a data processing request to the target coordinating server, such that a server cluster to which the target coordinating server belongs can process the data processing request preferentially.

In an embodiment, the data processing request may include at least one of the following items: a block data read request, a status data read request, a status data write request, or a transaction data read request. The block data read request may carry a position value of to-be-read block data or a code value of the to-be-read block data; the status data read request may carry a member identifier; the status data write request may carry a member identifier and the to-be-processed data; and the transaction data read request may carry a code value of to-be-read transaction data.

In an embodiment, the data processing request may direct to, also referred to as point to or correspond to, the to-be-processed data. For example, when the data processing request is a block data read request, the to-be-processed data may be to-be-read block data. When the data processing request is a status data read request, the to-be-processed data may be to-be-read status data. When the data processing request is a status data write request, the to-be-processed data may be to-be-written status data. When the data processing request is a transaction data read request, the to-be-processed data may be to-be-read transaction data.

In an embodiment, the server cluster to which the target coordinating server belongs processing the data processing request preferentially may include: when the server cluster to which the target coordinating server belongs can process the data processing request alone, the server cluster to which the target coordinating server belongs implements processing of the data processing request alone; and when the server cluster to which the target coordinating server belongs cannot process the data processing request alone, the target coordinating server can communicate with another coordinating server, such that the server cluster to which the target coordinating server belongs and a server cluster to which the other coordinating server belong jointly implement the processing of the data processing request.

Figure 3:
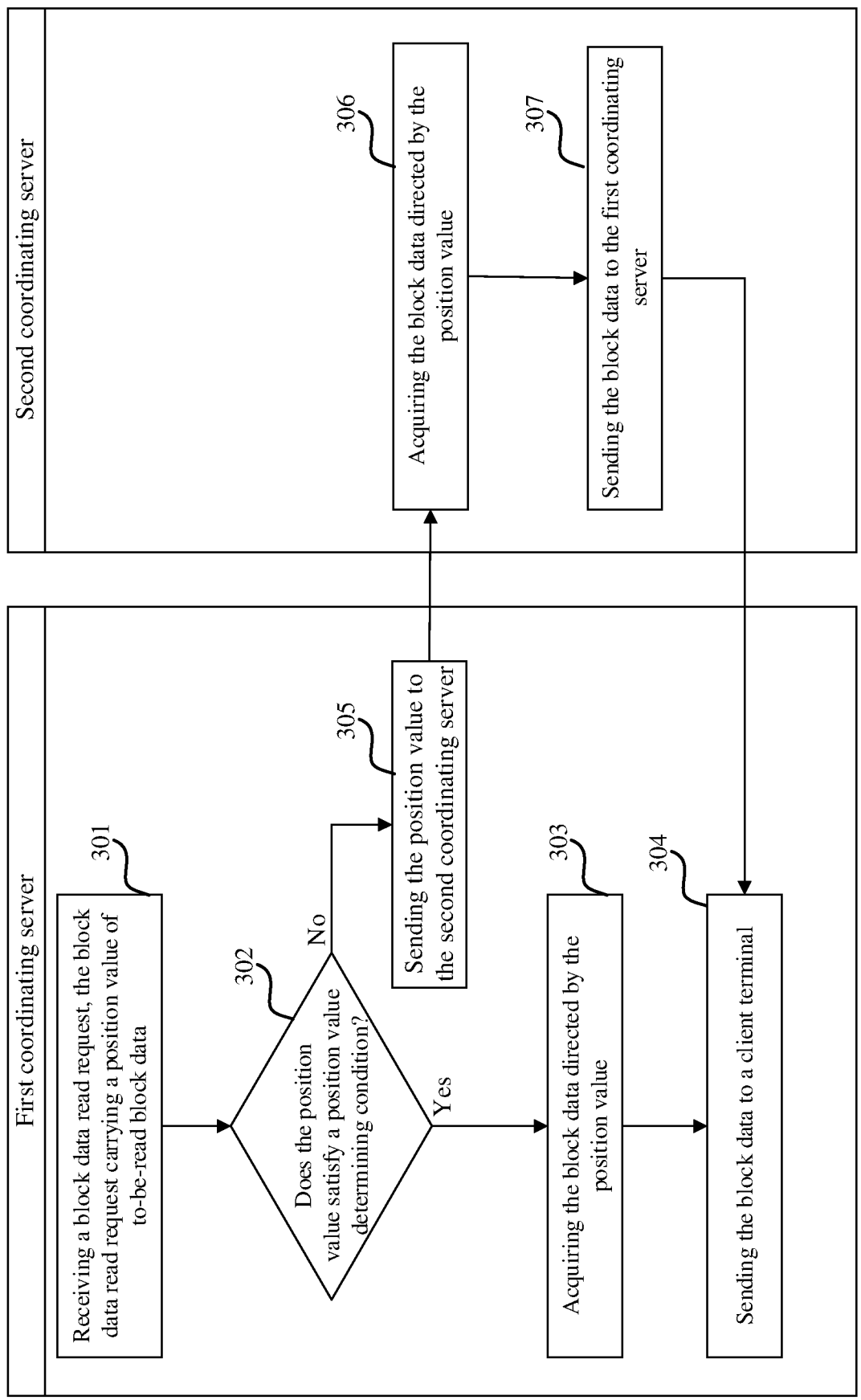
FIG. 3 is a flowchart of a method for reading block data according to an embodiment.

FIG. 3 is a flowchart of a method for reading block data according to an embodiment. In the embodiment, the to-be-processed data may be to-be-read block data. The client terminal can select the first coordinating server for use as the target coordinating server; and can send a block data read request to the first coordinating server. The block data read request may carry a position value of the to-be-read block data. The first coordinating server can receive the block data read request (301), and can determine whether the position value satisfies a position value determining condition (302).

When the position value satisfies the position value determining condition, the first coordinating server considers that the block data directed by the position value is stored in a server cluster where it is located, acquires the block data directed by the position value (303), and sends the acquired block data to the client terminal (304). Thus, the client terminal can receive the block data. For example, the first coordinating server can acquire, based on the position value configuration data, the first server identifier corresponding to the position value; and can send the position value to the first task server identified by the acquired first server identifier. The first task server identified by the acquired first server identifier can receive the position value; can acquire the block data directed by the position value locally; and can send the block data to the first coordinating server. The first coordinating server can receive the block data. Reference may be made to the above embodiments for the description of the position value configuration data.

When the position value does not satisfy the position value determining condition, the first coordinating server considers that the block data directed by the position value is stored in the second server cluster, and sends the position value to the second coordinating server (305). The second coordinating server can receive the position value, acquire the block data directed by the position value (306), and send the block data to the first coordinating server (307). The first coordinating server can receive the block data and send the block data to the client terminal (304). Thus, the client terminal can receive the block data. A process in which the second coordinating server acquires the block data directed by the position value is similar to a process in which the first coordinating server acquires the block data directed by the position value. The two processes can be referred to by each other for description thereof.

In an embodiment, the to-be-processed data may be to-be-read status data. The client terminal can select the second coordinating server for use as the target coordinating server; and can send a status data read request to the second coordinating server. The status data read request may carry a member identifier. The second coordinating server can receive the status data read request, acquire the second server identifier corresponding to the member identifier based on the member identifier configuration data, and send the member identifier to the second task server identified by the acquired second server identifier. The second task server identified by the acquired second server identifier can receive the member identifier, acquire the status data corresponding to the member identifier locally, and send the status data to the second coordinating server. The second coordinating server can receive the status data, and send the status data to the client terminal. Thus, the client terminal can receive the status data. Reference may be made to the above embodiments for the description of the member identifier configuration data.

In an embodiment, the to-be-processed data may be to-be-written status data. The client terminal can select the second coordinating server for use as the target coordinating server, and send a status data write request to the second coordinating server. The status data write request may carry a member identifier and the to-be-written status data. The second coordinating server can receive the status data write request, acquire the second server identifier corresponding to the member identifier based on the member identifier configuration data, and send the member identifier and the to-be-written status data to the second task server identified by the acquired second server identifier. The second task server identified by the acquired second server identifier can receive the member identifier and the to-be-written status data, store the to-be-written status data as the status data corresponding to the member identifier, and send response information to the second coordinating server. The second coordinating server can receive the response information, and send the response information to the client terminal. Thus, the client terminal can receive the response information.

Figure 4:
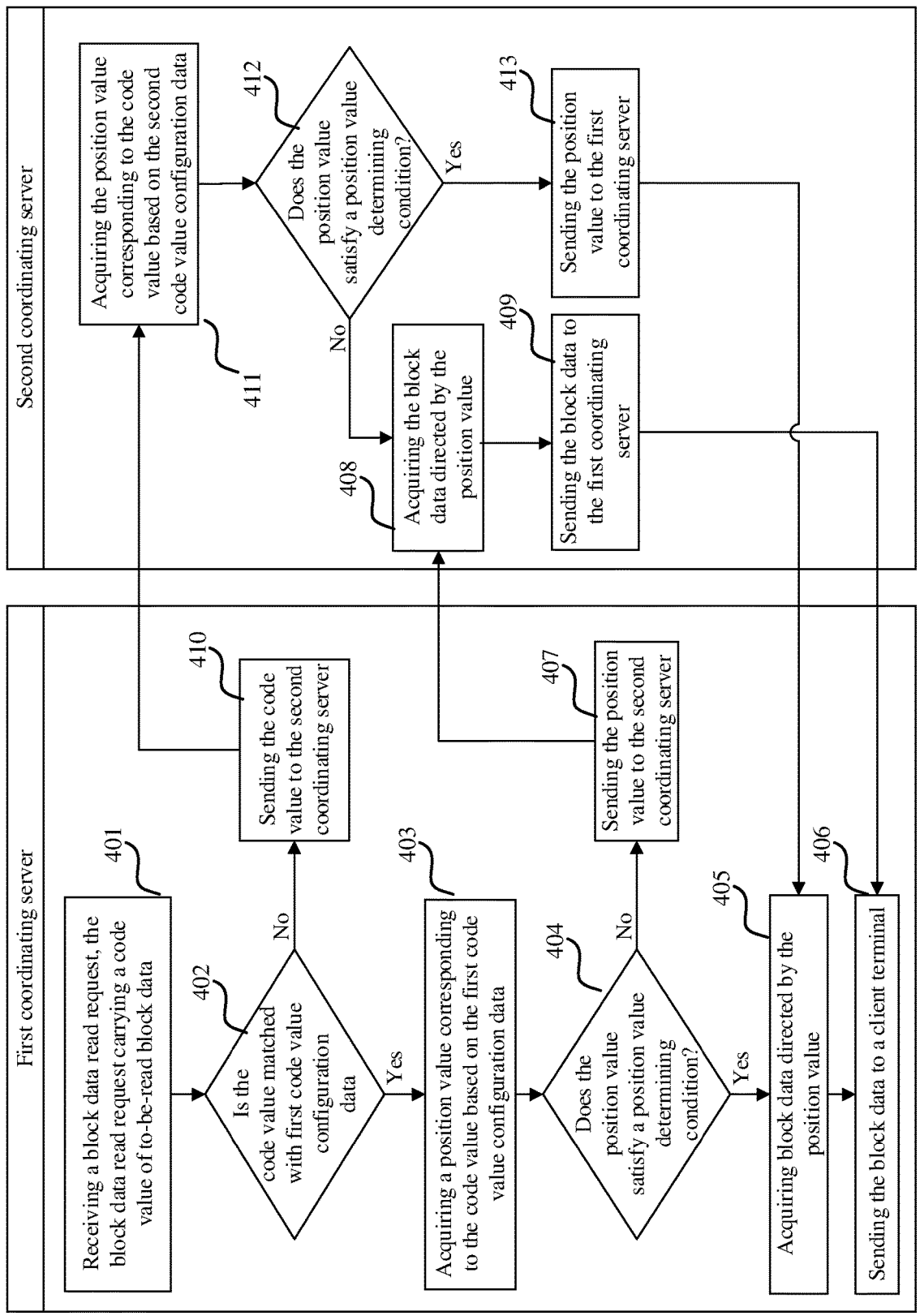
FIG. 4 is a flowchart of a method for reading block data according to an embodiment.

FIG. 4 is a flowchart of a method for reading block data according to an embodiment. In the embodiment, the to-be-processed data may be to-be-read block data. The client terminal can select the first coordinating server for use as the target coordinating server, and send a block data read request to the first coordinating server. The block data read request may carry the code value of the to-be-read block data. The first coordinating server can receive the block data read request (401), and match the code value with the first code value configuration data (402).

When a matching code value is found in the first code value configuration data, the first coordinating server can acquire the position value corresponding to the code value based on the first code value configuration data (403), and determine whether the position value satisfies a position value determining condition (404). When the position value satisfies the position value determining condition, the first coordinating server considers that the block data directed by the position value is stored in the server cluster where it is located, acquire the block data directed by the position value (405), and send the block data to the client terminal (406). Thus, the client terminal can receive the block data. When the position value does not satisfy the position value determining condition, the first coordinating server considers that the block data directed by the position value is stored in the second server cluster, and sends the position value to the second coordinating server (407). The second coordinating server can receive the position value, acquire the block data directed by the position value (408), and send the block data to the first coordinating server (409). The first coordinating server can receive the block data, and send the block data to the client terminal (406). Thus, the client terminal can receive the block data. Reference may be made to the above embodiments for the process in which the first coordinating server and the second coordinating server acquire the block data directed by the position value. A matching code value being found in the first code value configuration data may be understood as that: the code value carried in the block data read request is found in the first code value configuration data.

When no matching code value exists in the first code value configuration data, the first coordinating server considers that the code value can have a matching code value in the second code value configuration data, and send the code value to the second coordinating server (410). The second coordinating server can receive the code value, acquire the position value corresponding to the code value based on the second code value configuration data (411), and determine whether the position value satisfies the position value determining condition (412). When the position value does not satisfy the position value determining condition, the second coordinating server considers that the block data directed by the position value is stored in a server cluster where it is located, acquire the block data directed by the position value (408), and send the block data to the first coordinating server (409). The first coordinating server can receive the block data, and send the block data to the client terminal (406). Thus, the client terminal can receive the block data. When the position value satisfies the position value determining condition, the second coordinating server considers that the block data directed by the position value is stored in the first server cluster, and send the position value to the first coordinating server (413). The first coordinating server can receive the position value, acquire the block data directed by the position value (405), and send the block data to the client terminal (406). Thus, the client terminal can receive the block data. No matching code value existing in the first code value configuration data may be understood as that: the code value is not found from the first code value configuration data.

Figure 5:
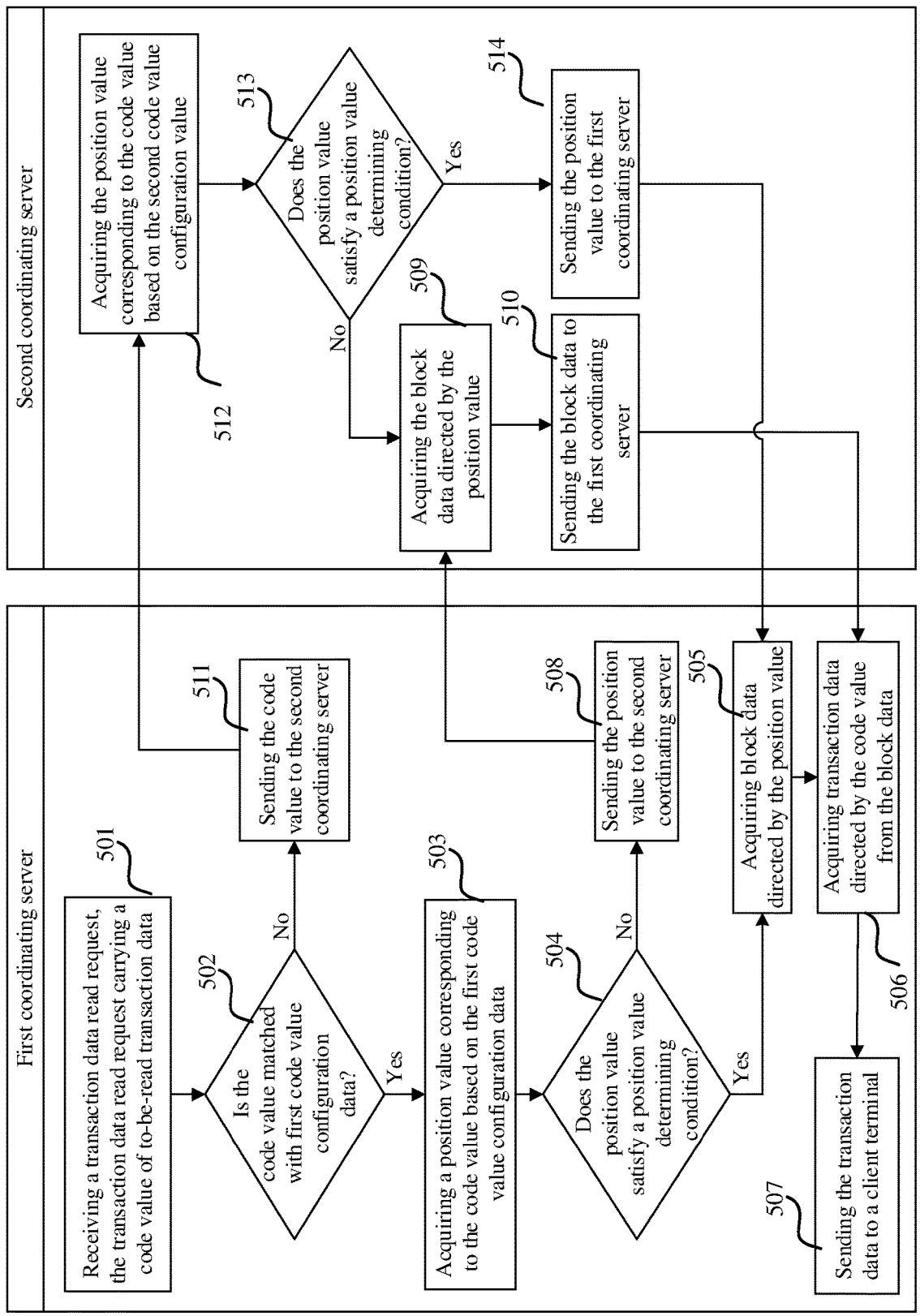
FIG. 5 is a flowchart of a method for reading transaction data according to an embodiment.

FIG. 5 is a flowchart of a method for reading transaction data according to an embodiment. In the embodiment, the to-be-processed data may be to-be-read transaction data. The client terminal can select the first coordinating server for use as the target coordinating server, and send a transaction data read request to the first coordinating server. The transaction data read request may carry the code value of the to-be-read transaction data. The first coordinating server can receive the transaction data read request (501), and match the code value with the first code value configuration data (502).

When a matching code value is found in the first code value configuration data, the first coordinating server can acquire the position value corresponding to the code value based on the first code value configuration data (503), and determine whether the position value satisfies a position value determining condition (504). When the position value satisfies the position value determining condition, the first coordinating server considers that the block data directed by the position value is stored in the server cluster where it is located, acquire the block data directed by the position value (505), acquire the transaction data directed by the code value from the block data (506), and send the transaction data to the client terminal (507). Thus, the client terminal can receive the transaction data. When the position value does not satisfy the position value determining condition, the first coordinating server considers that the block data directed by the position value is stored in the second server cluster, and sends the position value to the second coordinating server (508). The second coordinating server can receive the position value, acquire the block data directed by the position value (509), and send the block data to the first coordinating server (510). The first coordinating server can receive the block data, acquire the transaction data directed by the code value from the block data (506), and send the transaction data to the client terminal (507). Thus, the client terminal can receive the transaction data.

When no matching code value exists in the first code value configuration data, the first coordinating server considers that the code value can have a matching code value in the second code value configuration data, and send the code value to the second coordinating server (511). The second coordinating server can receive the code value, acquire the position value corresponding to the code value based on the second code value configuration data (512), and determine whether the position value satisfies the position value determining condition (513). When the position value does not satisfy the position value determining condition, the second coordinating server considers that the block data directed by the position value is stored in a server cluster where it is located, acquire the block data directed by the position value (509), and send the block data to the first coordinating server (510). The first coordinating server can receive the block data, acquire the transaction data directed by the code value from the block data (506), and send the transaction data to the client terminal (507). Thus, the client terminal can receive the transaction data. When the position value satisfies the position value determining condition, the second coordinating server considers that the block data directed by the position value is stored in the first server cluster, and send the position value to the first coordinating server (514). The first coordinating server can receive the position value, acquire the block data directed by the position value (505), acquire the transaction data directed by the code value from the block data (506), and send the transaction data to the client terminal (507). Thus, the client terminal can receive the transaction data.

In addition, as noted above, when the code value in the first code value configuration data and the second code value configuration data is the code value of the transaction data, each code value in the first code value configuration data and the second code value configuration data may also correspond to an offset. Thus, the first coordinating server can acquire the position value and the offset corresponding to the code value based on the first code value configuration data; and then can acquire the transaction data directed by the code value from the block data based on the offset. Alternatively, the second coordinating server can acquire the position value and the offset corresponding to the code value based on the second code value configuration data; and can send the offset to the first coordinating server. Then, the first coordinating server can acquire the transaction data directed by the code value from the block data based on the offset.

In the embodiment, the client terminal can select, based on a data attribute of to-be-processed data, a target coordinating server from a plurality of coordinating servers, and send a data processing request to the target coordinating server, such that a server cluster to which the target coordinating server belongs can process the data processing request preferentially. Thus, the client terminal can send data processing requests to different coordinating servers based on different data attributes of to-be-processed data, and achieve load balancing of server clusters, thereby accelerating the processing on the data processing requests.

Figure 6:
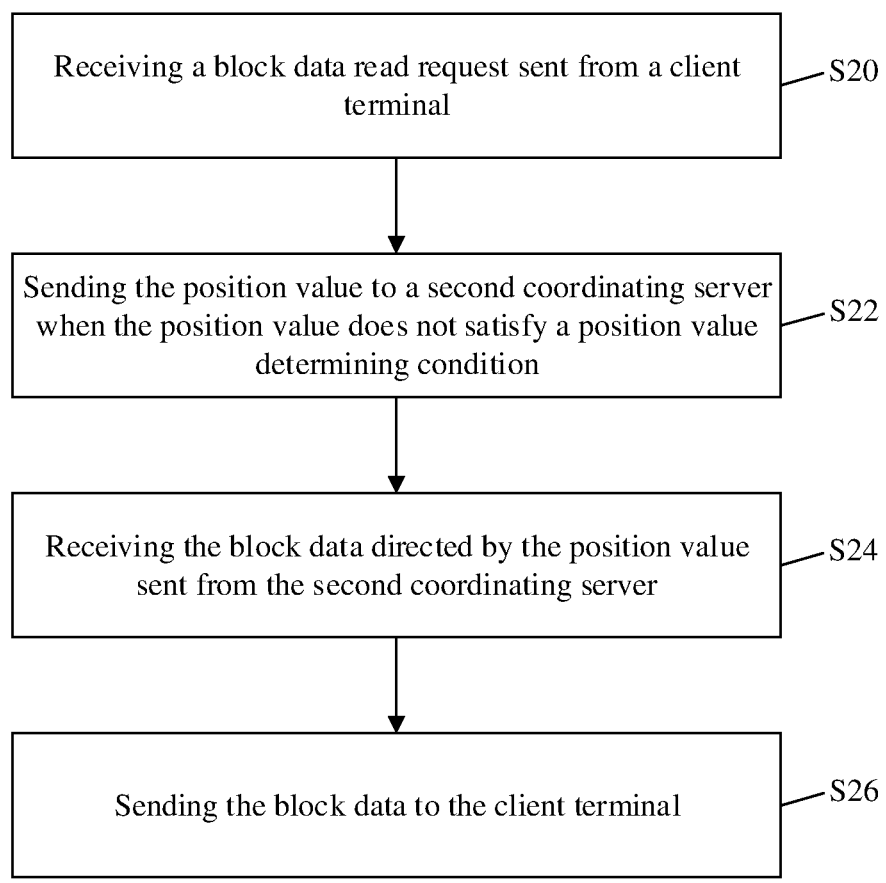
FIG. 6 is a flowchart of a method for data processing according to an embodiment.

FIG. 6 is a flowchart of a method for data processing according to an embodiment. For example, the method for data processing may be performed by a first coordinating server, and may include the following steps.

Step S20: receiving a block data read request sent from a client terminal.

In an embodiment, the client terminal can send the block data read request to the first coordinating server. The block data read request may carry a position value of to-be-read block data. The first coordinating server can receive the block data read request.

Step S22: sending the position value to a second coordinating server when the position value does not satisfy a position value determining condition.

In an embodiment, the first coordinating server can receive the block data read request, determine whether the position value satisfies the position value determining condition, and send the position value to the second coordinating server when the position value does not satisfy the position value determining condition.

Step S24: receiving the block data directed by the position value sent from the second coordinating server.

In an embodiment, the second coordinating server can receive the position value, acquire the block data directed by the position value, and send the block data to the first coordinating server. The first coordinating server can receive the block data. Reference may be made to the above embodiments for a process in which the second coordinating server acquires the block data directed by the position value.

Step S26: sending the block data to the client terminal.

In an embodiment, the first coordinating server can acquire the block data directed by the position value when the position value satisfies the position value determining condition, and send the block data to the client terminal.

In the above embodiments, the first coordinating server can receive a block data read request sent from a client terminal, send the position value to a second coordinating server when the position value does not satisfy a position value determining condition, receive the block data directed by the position value sent from the second coordinating server, and send the block data to the client terminal. Thus, the first coordinating server achieves feedback of the block data to the client terminal after receiving the block data read request.

Figure 7:
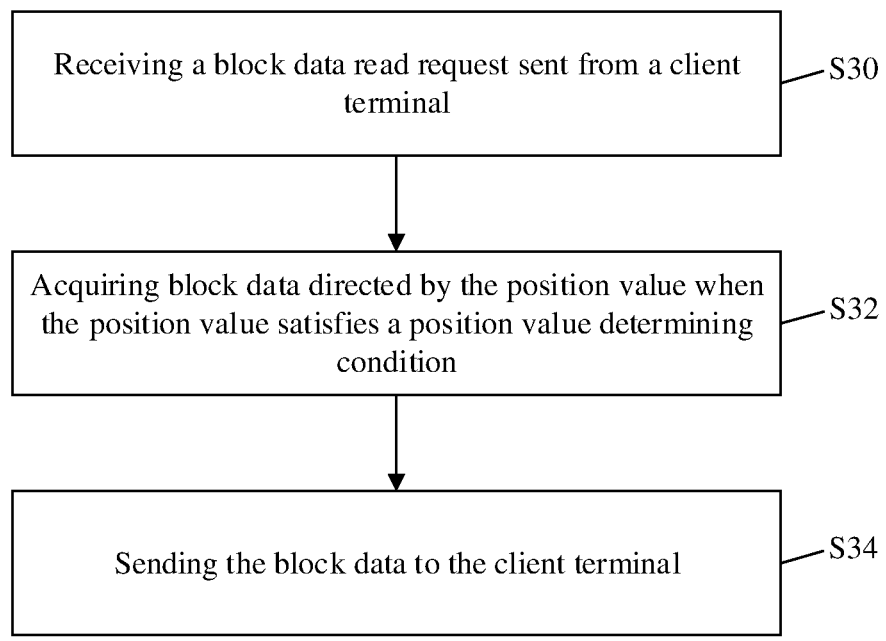
FIG. 7 is a flowchart of a method for data processing according to an embodiment.

FIG. 7 is a flowchart of a method for data processing according to an embodiment. For example, the method for data processing may be performed by a first coordinating server, and may include the following steps.

Step S30: receiving a block data read request sent from a client terminal.

In an embodiment, the client terminal can send the block data read request to the first coordinating server. The block data read request may carry a position value of to-be-read block data. The first coordinating server can receive the block data read request.

Step S32: acquiring block data directed by the position value when the position value satisfies a position value determining condition.

In an embodiment, the first coordinating server can receive the block data read request, determine whether the position value satisfies a position value determining condition, and acquire the block data directed by the position value when the position value satisfies the position value determining condition. Reference may be made to the above embodiments for a process in which the first coordinating server acquires the block data directed by the position value.

Step S34: sending the block data to the client terminal.

In an embodiment, the first coordinating server can send the position value to a second coordinating server when the position value does not satisfy the position value determining condition, receive the block data directed by the position value sent from the second coordinating server, and send the block data to the client terminal.

In the above embodiments, the first coordinating server can receive a block data read request sent from a client terminal, acquire block data directed by the position value when the position value satisfies a position value determining condition, and send the block data to the client terminal. Thus, the first coordinating server achieves feedback of the block data to the client terminal after receiving the block data read request.

Figure 8:
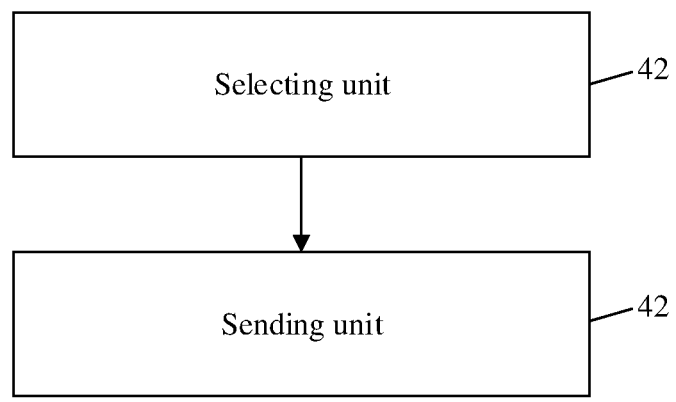
FIG. 8 is a schematic diagram of an apparatus for data processing according to an embodiment.

FIG. 8 is a schematic diagram of an apparatus for data processing according to an embodiment. For example, the apparatus for data processing may be applied to a client terminal. The apparatus for data processing may include a selecting unit 40 and a sending unit 42.

The selecting unit 40 is configured to select, based on a data attribute of to-be-processed data, a target coordinating server from a plurality of coordinating servers, the plurality of coordinating servers belonging to a plurality of server clusters respectively.

The sending unit 42 is configured to send a data processing request to the target coordinating server, such that a server cluster to which the target coordinating server belongs can process the data processing request preferentially, the data processing request directing to the to-be-processed data.

Figure 9:
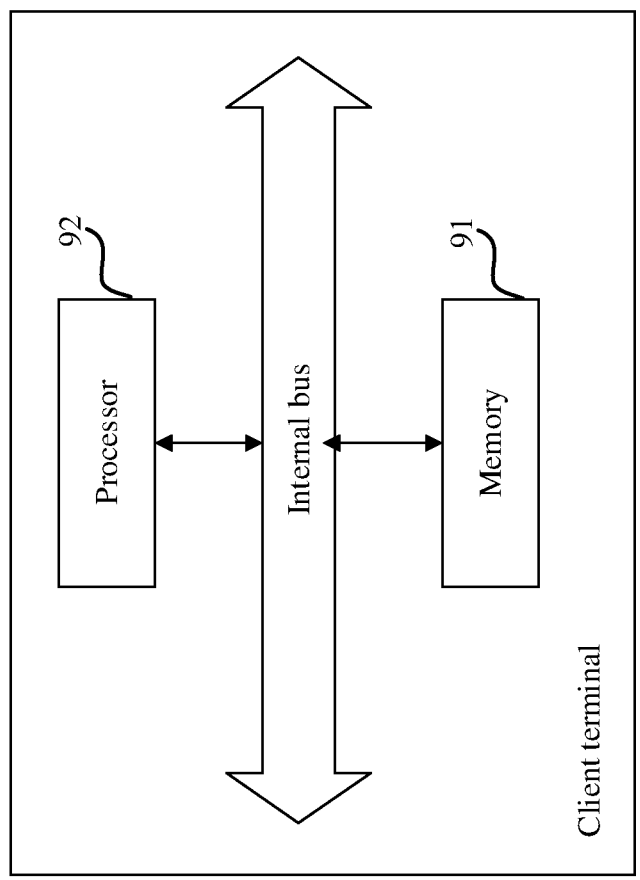
FIG. 9 is a schematic diagram of a client terminal according to an embodiment.

FIG. 9 is a schematic diagram of a client terminal according to an embodiment. The client terminal may include a memory 91 and a processor 92.

The memory 91 includes, but is not limited to, a Dynamic Random Access Memory (DRAM), a Static Random Access Memory (SRAM), and the like. The memory 91 may be configured to store computer instructions.

The processor 92 may be implemented in any suitable manner. For example, the processor 92 can take a form of, e.g., a microprocessor or processor, a computer-readable medium storing a computer-readable program code (e.g., software or firmware) that can be executed by the (micro) processor, a logic gate, a switch, an Application Specific Integrated Circuit (ASIC), a programmable logic controller, or an embedded microcontroller. The processor 92 may be configured to execute the computer instructions to perform the above described methods, such as performing the following steps: selecting, based on a data attribute of to-be-processed data, a target coordinating server from a plurality of coordinating servers, the plurality of coordinating servers belonging to a plurality of server clusters respectively; and sending a data processing request to the target coordinating server, such that a server cluster to which the target coordinating server belongs can process the data processing request preferentially, the data processing request directing to the to-be-processed data.

Figure 10:
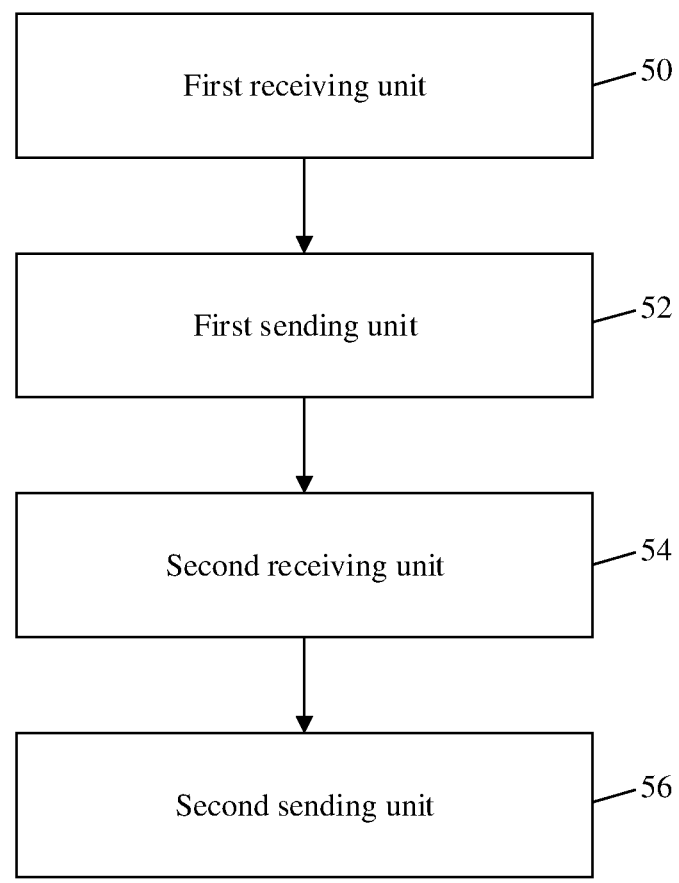
FIG. 10 is a schematic diagram of an apparatus for data processing according to an embodiment.

FIG. 10 is a schematic diagram of an apparatus for data processing according to an embodiment. For example, the apparatus for data processing may be applied to a first coordinating server. The apparatus for data processing may include a first receiving unit 50 configured to receive a block data read request sent from a client terminal, the block data read request carrying a position value of to-be-read block data; a first sending unit 52 configured to send the position value to a second coordinating server when the position value does not satisfy a position value determining condition; a second receiving unit 54 configured to receive the block data directed by the position value sent from the second coordinating server; and a second sending unit 56 configured to send the block data to the client terminal.

Figure 11:
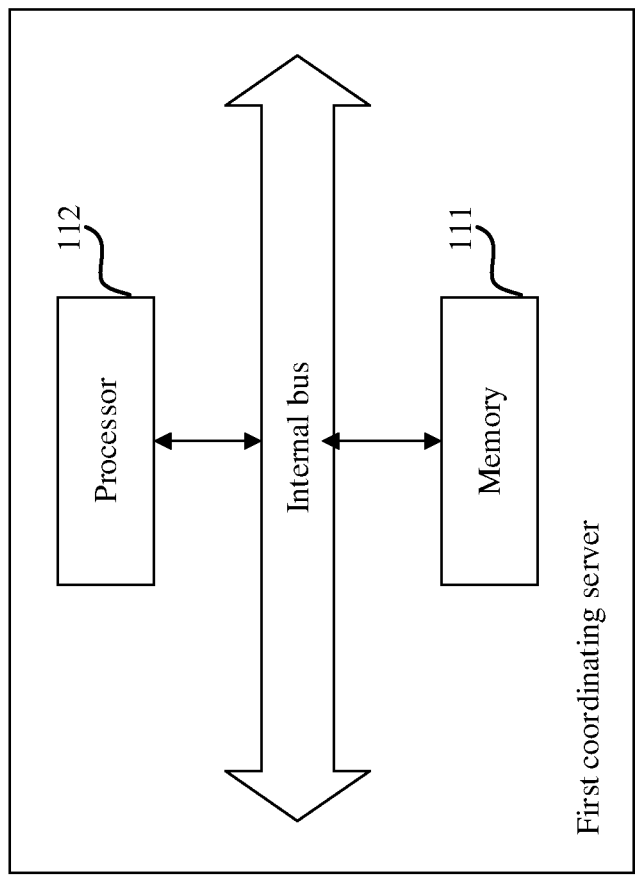
FIG. 11 is a schematic diagram of a coordinating server according to an embodiment.

FIG. 11 is a schematic diagram of a coordinating server according to an embodiment. For example, the coordinating server may be a first coordinating server, and may include a memory 111 and a processor 112.

The memory 111 includes, but is not limited to, a Dynamic Random Access Memory (DRAM), a Static Random Access Memory (SRAM), and the like. The memory 111 may be configured to store computer instructions.

The processor 112 may be implemented in any suitable manner. For example, the processor 112 can take a form of, e.g., a microprocessor or processor, a computer-readable medium storing a computer-readable program code (e.g., software or firmware) that can be executed by the (micro) processor, a logic gate, a switch, an Application Specific Integrated Circuit (ASIC), a programmable logic controller, or an embedded microcontroller. The processor 112 may be configured to execute the computer instructions to perform the above described methods, such performing the following steps: receiving a block data read request sent from a client terminal, the block data read request carrying a position value of to-be-read block data; sending the position value to a second coordinating server when the position value does not satisfy a position value determining condition; receiving the block data directed by the position value sent from the second coordinating server; and sending the block data to the client terminal.

Figure 12:
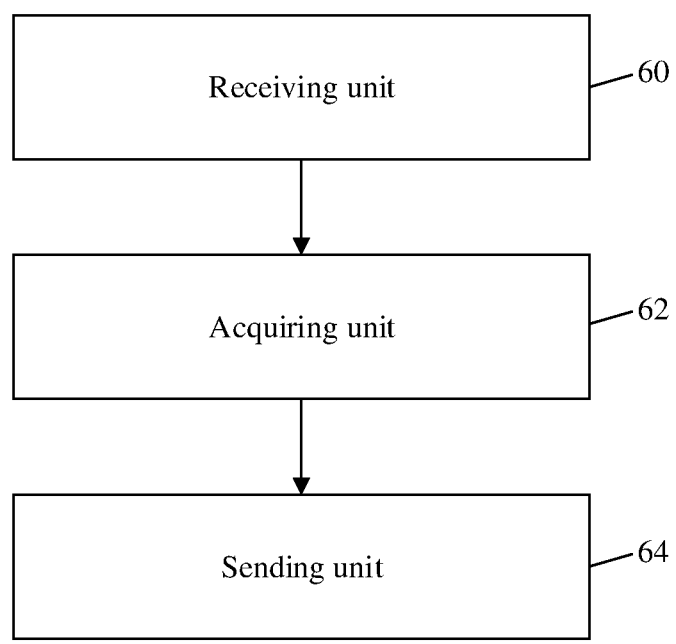
FIG. 12 is a schematic diagram of an apparatus for data processing according to an embodiment.

FIG. 12 is a schematic diagram of an apparatus for data processing according to an embodiment. For example, the apparatus for data processing may be applied to a first coordinating server. The apparatus for data processing may include a receiving unit 60 configured to receive a block data read request sent from a client terminal, the block data read request carrying a position value of to-be-read block data; an acquiring unit 62 configured to acquire the block data directed by the position value when the position value satisfies a position value determining condition; and a sending unit 64 configured to send the block data to the client terminal.

Referring back to FIG. 11, the processor 112 may also be configured to execute the computer instructions to perform the following steps: receiving a block data read request sent from a client terminal, the block data read request carrying a position value of to-be-read block data; acquiring the block data directed by the position value when the position value satisfies a position value determining condition; and sending the block data to the client terminal.

Various embodiments in the present specification are described in a progressive manner, and identical or similar portions between the various embodiments may be referred to mutually. The embodiments of the apparatus for data processing, the embodiments of the client terminal, and the embodiments of the server correspond to the embodiments of the method for data processing, which may be referred to for relevant content.

One of ordinary skill in the art will understand that improvement of many processes can be considered as direct improvement of hardware circuit structures. Designers can program improved processes into hardware circuits to obtain corresponding hardware circuit configurations. Therefore, improvement of a process can be implemented by a hardware entity module. For example, a Programmable Logic Device (PLD) (e.g., a Field Programmable Gate Array (FPGA)) is such an integrated circuit that its logic function is determined by a user through programming the device. A designer integrates a digital system onto a piece of PLD by independent programming without the need for requesting a chip manufacturer for designing and making application specific integrated circuit chip. Moreover, at present, instead of manually making an integrated circuit chip, this programming is also implemented mostly using logic compiler software, which is similar to a software compiler used for program development and compilation. However, the original code before compilation also has to be compiled using a specific programming language, which is known as a Hardware Description Language (HDL). There are many kinds of HDLs, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language). At present, VHDL (Very-High-Speed Integrated Circuit Hardware Description Language) and Verilog2 are most widely used. Those skilled in the art will also understand that, just by simple logic programming of a process using the above hardware description languages and programming the process into an integrated circuit, it will be very easy to obtain a hardware circuit implementing the logical process.

The systems, apparatuses, or units illustrated in the above-described embodiments may each be implemented by a computer chip or entity, or by a product having a certain function. A typical implementing device is a computer. For example, the computer may be a personal computer, a laptop computer, a cell phone, a camera phone, a smart phone, a personal digital assistant, a media player, a navigation device, an e-mail device, a game console, a tablet computer, a wearable device, or a combination of any of these devices.

The methods described above can be implemented as hardware, or software, a combination of hardware and software. A computer software product may be stored in a storage medium (such as a ROM/RAM, a magnetic disk, or an optical disc), and includes instructions for causing a computer device (which may be a personal computer, a server, a network device, or the like) to execute the methods in various embodiments or some parts of the embodiments of the present specification.

The methods described above can be used in many general purpose or special purpose computer system environments or configurations, for example: a personal computer, a server computer, a handheld device or portable device, a tablet device, a multiprocessor system, a microprocessor-based system, a set-top box, a programmable consumer electronic device, a network PC, a minicomputer, a mainframe computer, a distributed computing environment including any of the above systems or devices, etc.

The methods described above may be implemented by a computer-executable instruction executed by a computer, such as a program module. Generally, the program module includes a routine, a program, an object, a component, a data structure, and the like executing particular tasks or implementing particular abstract data types. The methods described above may also be implemented in distributed computing environments. In the distributed computing environments, tasks are executed by remote processing devices that are linked through a communication network. In the distributed computing environments, the program module may be located in local and remote computer storage media including a storage device.

While the present specification has been described with reference to the embodiments, those of ordinary skills in the art will understand that the present specification has many variations and changes without departing from the spirit of the present specification, and the appended claims cover these variations and changes without departing from the spirit of the present specification.

The invention claimed is:

1. A method for data processing, comprising:
   selecting, based on a data attribute of to-be-processed data, a target coordinating server from a plurality of coordinating servers, the plurality of coordinating servers belonging to a plurality of server clusters respectively, wherein the to-be-processed data include status data and at least one of block data or transaction data of a blockchain, the data attribute of the status data being configured to indicate that the status data can change, the data attribute of the block data being configured to indicate that the block data cannot change, and the data attribute of the transaction data being configured to indicate that the transaction data cannot change; and
   sending a data processing request to the target coordinating server, such that a server cluster to which the target coordinating server belongs processes the data processing request preferentially, the data processing request directing to the to-be-processed data;
   wherein the plurality of coordinating servers comprise a first coordinating server belonging to a first server cluster and a second coordinating server belonging to a second server cluster, a data processing capacity of the second server cluster being greater than a data processing capacity of the first server cluster;
   wherein selecting the target coordinating server from the plurality of server clusters comprises:
   selecting the second coordinating server that has the data processing capacity greater than that of the first server cluster, for use as the target coordinating server for the status data.

2. The method according to claim 1, wherein the plurality of server clusters correspond to a same blockchain node.

3. The method according to claim 1, wherein selecting the target coordinating server from the plurality of coordinating servers further comprises:
   selecting the first coordinating server for use as the target coordinating server for the block data or the transaction data.

4. The method according to claim 1, wherein the data processing request comprises a block data read request; and the block data read request carries a position value or a code value of to-be-read block data.

5. The method according to claim 1, wherein the data processing request comprises a status data read request; and the status data read request carries a member identifier.

6. The method according to claim 1, wherein the data processing request comprises a status data write request; and the status data write request carries a member identifier and to-be-written status data.

7. The method according to claim 1, wherein the data processing request comprises a transaction data read request; and the transaction data read request carries a code value of to-be-read transaction data.

8. A client terminal, comprising:
a memory configured to store computer instructions; and
a processor configured to execute the computer instructions to perform:
selecting, based on a data attribute of to-be-processed data, a target coordinating server from a plurality of coordinating servers, the plurality of coordinating servers belonging to a plurality of server clusters respectively, wherein the to-be-processed data include status data and at least one of block data or transaction data of a blockchain, the data attribute of the status data being configured to indicate that the status data can change, the data attribute of the block data being configured to indicate that the block data cannot change, and the data attribute of the transaction data being configured to indicate that the transaction data cannot change; and
sending a data processing request to the target coordinating server, such that a server cluster to which the target coordinating server belongs processes the data processing request preferentially, the data processing request directing to the to-be-processed data;
wherein the plurality of coordinating servers comprise a first coordinating server belonging to a first server cluster and a second coordinating server belonging to a second server cluster, a data processing capacity of the second server cluster being greater than a data processing capacity of the first server cluster;
wherein selecting the target coordinating server from the plurality of server clusters comprises:
selecting the second coordinating server that has the data processing capacity greater than that of the first server cluster, for use as the target coordinating server for the status data.

9. The client terminal according to claim 8, wherein the plurality of server clusters correspond to a same blockchain node.

10. The client terminal according to claim 8, wherein the processor is further configured to execute the computer instructions to perform:
selecting the first coordinating server for use as the target coordinating server for the block data or the transaction data.

11. The client terminal according to claim 8, wherein the data processing request comprises a block data read request; and the block data read request carries a position value or a code value of to-be-read block data.

12. The client terminal according to claim 8, wherein the data processing request comprises a status data read request; and the status data read request carries a member identifier.

13. The client terminal according to claim 8, wherein the data processing request comprises a status data write request; and the status data write request carries a member identifier and to-be-written status data.

14. The client terminal according to claim 8, wherein the data processing request comprises a transaction data read request; and the transaction data read request carries a code value of to-be-read transaction data.

* * * * *